May 4, 1954  A. L. SENN  2,677,141
SHIP LOADING APPARATUS
Filed April 21, 1950  3 Sheets-Sheet 1
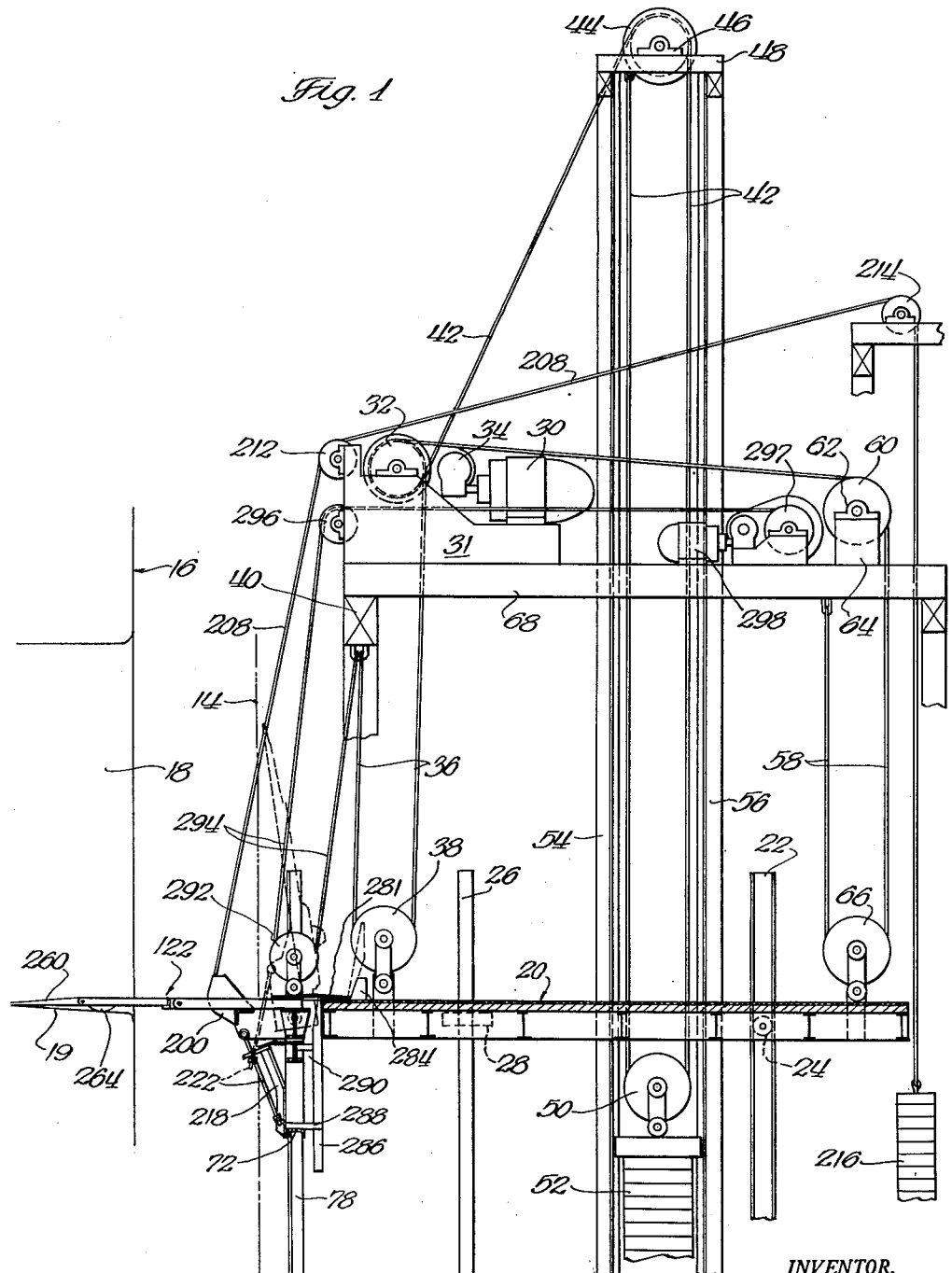
Fig. 1
INVENTOR.
Arthur L. Senn
BY
ATTYS.

May 4, 1954  A. L. SENN  2,677,141
SHIP LOADING APPARATUS
Filed April 21, 1950  3 Sheets-Sheet 2
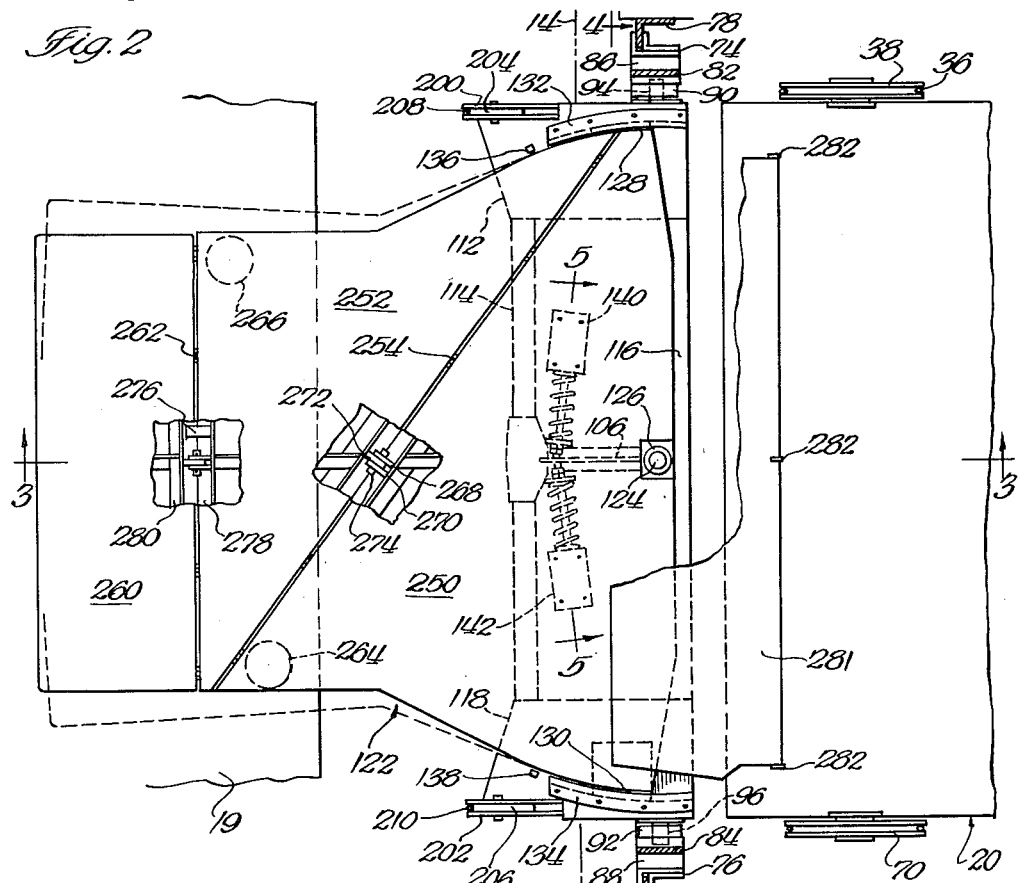
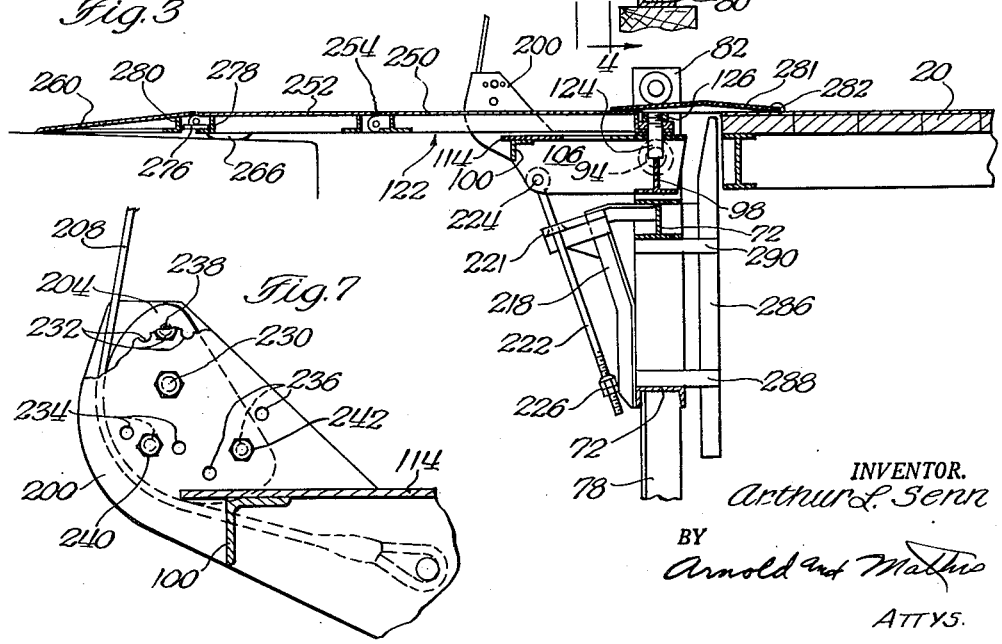
INVENTOR.
Arthur L. Senn
BY
Arnold and Mathis
ATTYS.

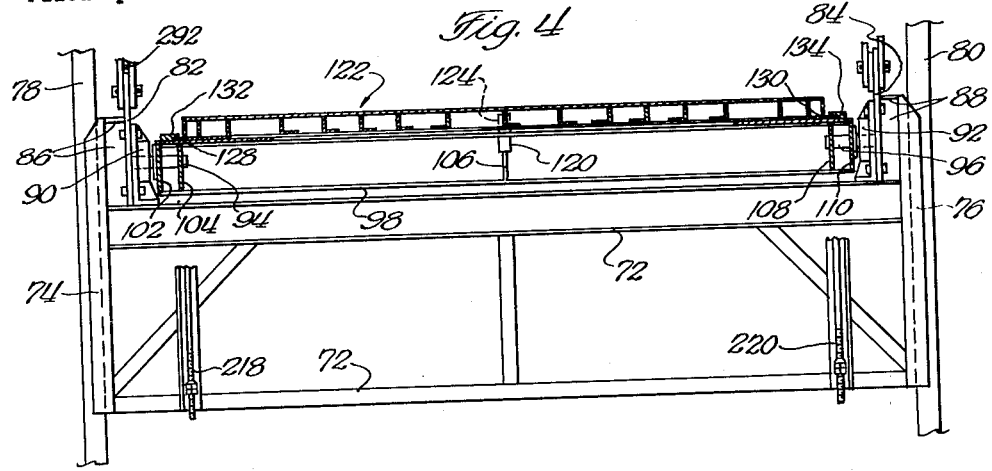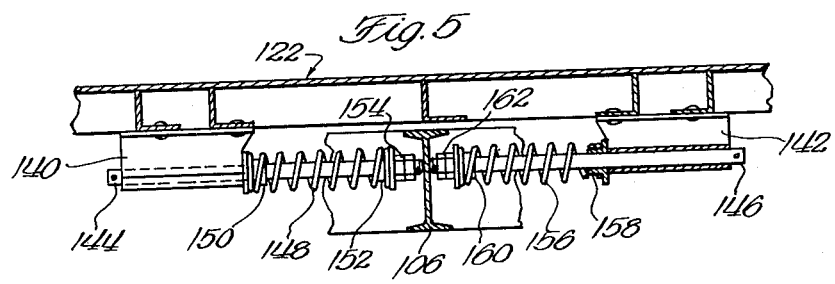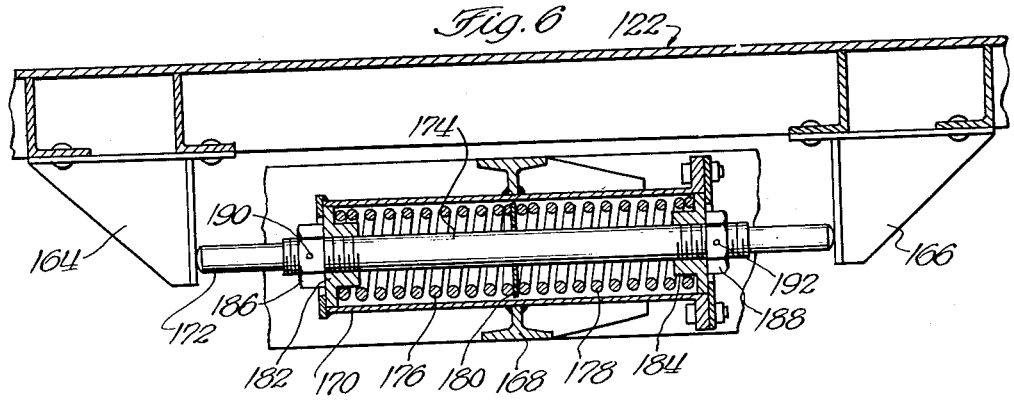

Patented May 4, 1954

2,677,141

UNITED STATES PATENT OFFICE 2,677,141

SHIP LOADING APPARATUS

Arthur L. Senn, Seattle, Wash., assignor to Colby Steel & Manufacturing, Inc., Seattle, Wash., a corporation of Washington Application April 21, 1950, Serial No. 157,320

6 Claims. (Cl. 14—71)

This invention relates to ship loading apparatus, particularly to apparatus for side port loading of ships moored alongside a wharf.

In loading and unloading ships it is conventional practice to berth the ship alongside a wharf with a side port in the ship stationed opposite the loading apparatus on the wharf. After opening the side port, an apron communicating with the wharf usually through a ramp or elevator is placed within the port after which the cargo is removed from or loaded on the ship as desired.

In proceeding in this manner it is difficult to align the side port and the loading apparatus with the necessary accuracy in the first instance, and also to maintain them in aligned position over the substantial periods of time required by the loading and unloading operation. In the first place, the ships themselves are of varying vertical dimensions and provided with a number of decks which varies from ship to ship. In the second place there are pronounced tidal variations causing corresponding variations in the elevation of the ship with reference to the wharf from hour to hour. Thirdly, in addition to the foregoing factors causing vertical misalignment, there also is the horizontal misalignment caused by the difficulty of mooring the ship exactly opposite the loading apparatus, and by the movement of the ship during loading. Still further, a problem is presented by the fact that the deck of the ship itself may be sloping, either because of its sheer, or because of uneven loading fore and aft. This makes it difficult to place the apron flush with the deck and in uniform contact therewith across its entire width.

It therefore is the general object of the present invention to provide ship loading apparatus which is articulated and universally applicable to the loading and unloading of ships of varying dimensions and design moored alongside wharfs in varying physical environments.

It is another object of this invention to provide ship loading apparatus which is adjustable readily and accurately in a vertical direction to compensate for tidal variations in ship elevation.

It is another object of this invention to provide ship loading apparatus which is adjustable readily and accurately in a horizontal direction to compensate for horizontal misalignment of the ship and the loading apparatus.

Still another object of this invention is the provision of ship loading apparatus provided with an apron designed to be placed on a ship's deck and to remain in uniform contact therewith across the entire width of the apron despite the sheer of the deck and inequalities of loading fore and aft.

It is another object of this invention to provide loading apparatus for ships which is adjustable horizontally to compensate for the longitudinal misalignment of the ship, but which is self centering when such adjustment is not necessary, or when the apparatus is not in use.

Still another object of this invention is the provision of ship loading apparatus which is adaptable for use in construction with elevating apparatus of diverse sorts, such as ramps, or elevators.

Still a further object of this invention is the provision of ship loading apparatus which is delicately counterbalanced and provided with means for preventing overbalancing and for adjustment of the counterbalancing mechanism as required by the demands of particular installations.

The manner in which the foregoing and other objects of this invention are accomplished will be apparent from the accompanying specification and claims considered together with the drawings wherein:

Figure 1 is a view in elevation partly in section of the ship loading apparatus of the present invention taken substantially along the longitudinal center line thereof;

Figure 2 is an enlarged plan view of the ship loading apparatus illustrated in Figure 1;

Figure 3 is a sectional view in elevation taken along the lines 3, 3 of Figure 2;

Figure 4 is a sectional view in elevation taken along the lines 4, 4 of Figure 2;

Figure 5 is a sectional view in elevation taken along the lines 5, 5 of Figure 2;

Figure 6 is a sectional view in elevation similar to Figure 5 but illustrating an alternate construction; and Figure 7 is a detail view in side elevation of a mechanism for use in counterbalancing the ship loading apparatus of Figure 1.

The presently described ship loading apparatus broadly comprises elevator means such as an elevator or a ramp for raising and lowering cargo to and from deck level in combination with apron means for interconnecting the elevator means and the deck. In addition, there is a supporting frame, which may be the ramp itself and means for mounting the apron means on the supporting frame for angular movement in both horizontal and vertical planes. This makes possible exact alignment of the apron with the deck of the ship. In addition, means are provided for articulating the elements of the apron in such a manner that the lip of the apron will lie flat upon the deck even though the angle and the elevation of the deck varies with time. Still further, means are provided for raising and lowering the apron to inoperative and operative positions, for automatically centering the apron when in inoperative position, and for adjustably counterbalancing the apron to facilitate its raising and lowering.

In the embodiment of Figures 1 to 7, inclusive, the presently described ship loading apparatus is illustrated as applied in a wharf, the face of which is indicated by dotted line 14. Adjacent the wharf and spaced apart therefrom as by means of the conventional bumper logs is a ship 16 having therein a side port 18 affording access to the deck 19. An elevator 20 is suitably mounted in the wharf for vertical movement, riding in tracks 22 adapted to receive wheels 24 rotatably attached to the elevator. The elevator may be further restrained from movement in a horizontal plane by means of rubbing strips 26 stationed one on each side of the elevator and cooperating with contact blocks 28 thereon.

Raising and lowering of the elevator may be accomplished by suitable driving means, for example by means of the counterweighted system illustrated particularly in Figure 1. A motor 30 mounted on a structural member 34 drives a drum 32 through a gear reducer 34. The drum carries a flexible member or cable one length 36 of which passes around pulley 38 and dead ends on the structural member 40.

Another length 42 of the cable, or if desired, a separate cable, extends upwardly from drum 32 over pulley 44 rotatably mounted in bearings 46 supported by a suitable structural member 48. Cable section 42 then passes downwardly around pulley 50 and then upwardly to structural member 48 where it dead ends. Pulley 50 is attached to counterweight 52 which may be of conventional construction and moves between the vertical guides 54, 56.

The mechanism for raising and lowering the elevator 20 also includes the cable 58 operated in unison with cable 36 by means of the drum 32. Cable 58 passes over the pulley 60 mounted in bearings 62 carried by the structural member 64. It then passes around pulley 66 and dead ends on structural member 68.

Although the elevator drive has been described and illustrated herein with respect to one side of the elevator only, it will be understood that this drive may be applied symmetrically to the opposite sides of the elevator through linkages identical with those illustrated. Thus on the opposite side of the elevator there may be pulleys corresponding to pulley 38 and 66, one being indicated at 70 in Figure 2, and both being operated in conjunction with cables running from drum 32 in the manner explained above.

The elevator 20 thus is adapted to be raised and lowered for the purpose of transferring cargo between the deck 19 of the ship and the surface of the wharf. To this end, there are provided apron means for interconnecting the elevator and the ship. The apron means is mounted on a supporting frame or crosshead 72 illustrated particularly in Figure 4. The crosshead comprises a reinforced frame of suitable structural members having on opposite sides the slides 74, 76 which are associated with the vertical guides 78, 80, respectively. The latter extend upwardly substantially parallel to the vertical frame members of the elevator and a spaced distance therefrom. In this manner, it is possible to raise and lower the supporting crosshead 72 and the apron assembly which it carries to selected positions coordinated with the relative positions of the elevator and the ship.

Means are provided for mounting the apron assembly on the crosshead 72 for vertical angular movement, thereby making possible adjusting the apron assembly to an upright, inoperative position, as well as to a plurality of substantially horizontal operative positions as required by the differential elevation between the deck 19 of the ship and the supporting crosshead 72. Thus, attached to cross head 72 on opposite sides thereof and extending upwardly therefrom are the standards 82, 84. These are connected to slides 74, 76 by plates 86, 88 and carry bearings 90, 92.

Trunnions 94, 96 extend within the bearings 90, 92, respectively. The trunnions are associated with a trunnion frame constructed from suitably arranged structural members including the crosspieces 98, 100, the longitudinal pieces 102, 104, 106, 108, and 110 and the surface plates 112, 114, 116, and 118. Crosspiece 98 and longitudinal member 106 are recessed at their point of juncture to form a pocket 120, the purpose of which will appear hereinafter. In this manner, the trunnion frame is mounted on the crosshead for angular movement in a vertical plane about the trunnion bearings.

An apron indicated generally at 122 is mounted on the trunnion frame for angular motion in a substantially horizontal plane, as by being journalled thereto. Thus, contained within the pocket 120 in the trunnion frame and rigidly affixed to the latter as by being welded thereto is the vertical pin 124. The free end of the pin may be threaded and extends upwardly through an opening in the apron 122, being secured thereto by means of nut 126.

Suitable guide means cooperate with the pin 124 in permitting horizontally angular motion of the apron. Thus there may be provided plates 128, 130 extending laterally from opposite sides of the apron. These are adapted to slide on the surface plates of the trunnion frame and to move within guides 132, 134, respectively, on the latter. Hence the apron is free to pivot horizontally about the pin 124, the pivotal movement being directed by the guideways 132, 134.

The extent of the horizontal movement of the apron is limited in the illustrated embodiment by the shearable pins 136, 138. These extend upwardly from the surface of the trunnion frame and are adapted to be contacted respectively by the laterally projecting plates 128, 130 on the apron. Then, upon horizontal angular movement of the apron, one or the other of the pins will be contacted by the plates, arresting the movement of the apron. However, in the event of an accident, such as would occur if the ship were to move inadvertently a substantial distance forwardly or rearwardly with the apron extending into a side port, one or the other of the shear pins will be severed, permitting continued horizontally angular movement of the apron and avoiding buckling or otherwise damaging it.

Means also are provided for automatically returning the apron to its central or full line position (Figure 2) after angular displacement therefrom in a horizontal plane. Such means are illustrated in detail in Figures 5 and 6.

In the embodiment of Figure 5, a stop or thrust plate, which may be the structural member 106, is included in the trunnion frame assembly. Also provided are a pair of brackets 140, 142 depending from the apron on opposite sides of the stop a spaced distance therefrom. Slidably mounted within the brackets 140, 142 are the rods 144, 146, respectively, the inner ends of which bear against the stop plate. A spring 148 encircles rod 144 and is held in place by collars 150, 152 and lock nuts 154 in threaded engagement with the end of the rod. Similarly, a spring 156 encircles the rod 146, being held in place by collars 158, 160 and lock nuts 162. It will be apparent that, when the apron 122 is displaced angularly in a horizontal plane from a central position, one or the other of springs 148, 156 will be compressed, thereby causing the corresponding one of rods 144, 146 to exert a thrust against stop 106. Then, when the force causing the angular movement of the apron is removed, this thrust will serve to return the apron automatically to its central position.

In the embodiment of Figure 6, there are a pair of stops 164, 166 affixed to and depending from the under side of the apron a spaced distance on either side of the structural member 168 carried by the trunnion frame. A cylinder 170 is affixed rigidly to member 168. Slidably mounted within the cylinder longitudinally thereof and projecting from both of its ends is the rod 172 adapted to engage the stops 164, 166. A sleeve 174, the terminal portions of which are threaded, is rigidly affixed to or is integral with rod 172.

Also contained within the cylinder are springs 176, 178 separated by washer 180. These springs provide resilient means for resisting longitudinal movement of the rod 172 and to this end are held in place by means of the collars 182, 184 slidably mounted on the sleeve 174. Nuts 186, 188 engage the threaded portions of sleeve 174 and are provided with set screws 190, 192 for locking them in any desired position on the sleeve. By adjustment of the nuts 186, 188, any desired tension can be placed upon the springs within the cylinder.

Hence, upon horizontally angular movement of the apron, the rod 172 will be displaced in a longitudinal direction against the tension of one or the other of the springs 176, 178. Upon removal of the displacing force, however, the tension of the springs will return the rod, and hence the apron with which it is associated, to its central position, the rate of the return motion being determined by the tension of the springs which, in turn, is determined by the setting of the nuts 186, 188.

Means also are provided for counterweighting the apron assembly, including the trunnion frame, to facilitate its pivoting in a vertical plane about the trunnion bearings on which it is mounted. Attached to the trunnion or supporting frame at opposite sides thereof are the forwardly and upwardly extending projections or cam arms 200, 202. Each of these preferably is formed from a pair of spaced apart, substantially parallel plates having therebetween the cam plates 204, 206, respectively. Cables 208, 210 are associated one with each of the cam arms. The cables dead end at the base of the cam arm, and pass upwardly about the cam plate and thence upwardly over pulleys 212 and 214 mounted on suitable structural members. The free ends of the cables then are attached to counterweights, one of which is indicated by numeral 216 in Figure 1, which move in suitably constructed guideways not illustrated.

Stop means are provided for limiting the extent of upward pivotal movement of the apron, it being desirable to arrest this movement just past dead center in a position such that the apron will not inadvertently be blown down, or pushed down by casual contact, but yet may be started on its downward path without application of undue force when this is desired. Attached to the crosshead frame 72 at opposite sides thereof are a pair of brackets 218, 220, the construction of one of which (218) is illustrated particularly in Figure 3.

Thus bracket 218 has a forwardly projecting perforate extension 221. A rod 222 extends through the perforation in this extension and is pivotally attached to the trunnion frame through pin 224.

Rod 222 has thereon a movable projection adapted to be placed in a selected one of a plurality of stations along its length and to contact the extension 221 upon upwardly pivotal movement of the apron. In the illustrated embodiment, the free end of the rod is threaded for engaging lock nuts 226, which therefore serve as the movable projection. Then upon elevating the apron by pivoting it on trunnions 94, 96, the rod will slip through the openings in the bracket extension until the lock nuts engage the under side of the extension. This will halt the upward movement of the apron at an adjustable position determined by the position of the lock nuts on the rod.

Since the inclination of the stretch of cable 208 between cam arm 200 and pulley 212 determines the moment of the apron when the latter is in upright position and since this angle may be variable, pulley 212 being stationed variously from installation to installation because of differences in location of the structural member to which it is attached, it is desirable to provide means for varying the inclination so that, in any given installation, the apron moment may be adjusted to an optimum value. Such means are provided by the cam plates 204, 206 referred to above in connection with the cam arms 200, 202. Cam plate 204, which is mounted in its cam arm in the same manner as is cam plate 206 in its cam arm is pivotally attached to the arm by means of pin 230, extending transversely through the cam plate and the plates comprising the cam arm. The cam plate is perforated, and the plates comprising the cam arm also are provided with perforations at spaced intervals which are adapted to register with the perforations in the cam plate. A pin then may be inserted through the registering perforations holding the cam plate in a desired position.

In the construction illustrated particularly in Figure 7, the cam is perforated on a plurality of radii, and the cam arm is also perforated on a plurality of corresponding radii. This makes possible using a plurality of pins, distributing the load over the cam arm and correspondingly stabilizing the construction, and permitting a plurality of relative adjustments of the cam plates 204 and 206. Thus the cam is triply perforated and the plates comprising the cam arm are perforated in a triple series containing three groups 232, 234, 236 of perforations. Then, when the perforations in the cam are placed in registry with selected ones of the perforations in the plates comprising the cam arm, pins 238, 240 and 242 may be placed therein securely assembling the cam arm and maintaining the cable 208 at a desired angle.

The apron 122 preferably has an articulated construction which enables it to contact the deck of the ship uniformly regardless of changes in position of the latter. It thus may be constructed in three sections, two of these being triangular in outline and hinged diagonally together to form a section of substantially quadrilateral outline. This permits adjustment of the apron to conform automatically to the sheer of the deck. Then hingedly attached to the terminal portion of the apron there may be an apron lip hinged of the apron for angular movement to the body of the apron for angular movement in a vertical plane. This accommodates the apron to changes in elevation of the ship relative to the wharf.

Thus the apron may be composed of a first triangular section 250 constructed from suitable plates and bracing members and connected to the supporting frame or trunnion frame through pin 124 and associated guides 132, 134 in the manner explained above. A second triangular section 252 may be attached to the section 250 by a diagonal hinged joint 254. The apron lip 260 then may be attached to the body of the apron through the transverse hinged joint 262.

To stabilize the apron construction and to permit its sliding movement on the deck of the ship, there are placed on the under side of the apron suitably disposed contact plates or bearing plates. Thus on the under side of triangular section 250, interconnecting the brace members forming the apex of the forwardly extending angle thereof, there may be placed the bearing plate 264. A complementary bearing plate 266 then may be affixed to the under side of the triangular section 252 at a point substantially opposite the plate 264. These plates preferably have arcuate outer surfaces and, in addition to serving the function of support members, also serve that of glides permitting the sliding movement of the apron over the deck of the ship without scratching or gouging the same.

Although a variety of hinged constructions may be employed in uniting the triangular sections 250 and 252 and in attaching the lip section 260 to the body of the apron, a preferred construction is illustrated in Figures 2 and 3. A plurality of individual hinges are stationed at intervals along the length of each of these joints. Each hinge comprises a pair of spaced, perforated, outwardly extending tabs or knuckles 268, 270 attached to one of the apron sections and forming the female member of the hinge, and a perforated tab or knuckle 272 extending outwardly from the opposed apron section and forming the male member of the hinge. When the tabs are in position with the perforations therein in registry with each other they may be held together by means of a pin 274 penetrating the registering perforations.

To limit the downwardly pivotal movement of the apron sections about the hinged joints 254, 262, suitable stop means are provided. In the form selected for illustration, such stop means comprise a plurality of stop plates associated with the joints and stationed at spaced intervals along the same. Such a stop plate 276 is illustrated in Figure 3. It is welded or otherwise rigidly affixed to the structural member 278 on one section of the apron and stationed a spaced distance from the structural member 280 on the opposed apron lip. Thus it will be apparent that the apron lip can swing downwardly until the stop plate engages the member 280. The spacing of the plate from the member 280 thus affords a convenient means of determining the stop point of the apron sections.

Thus the section 250 may be hinged to supporting structure on the dock side and preferably for pivotal movement both in vertical and horizontal planes. The member 250 will then be supported on the dock side and will be supported on the ship board side by the apex of the triangular member 250 adjacent the support member 264 or may be supported and is preferably supported by said support member 264. Thus we have a diagonal truss following the hinge 254. This diagonal truss or beam hingedly supports the triangular member 252. The member 252 can be raised or lowered to follow the angular disposition of the deck or cowling of a ship relative to the horizontal. Preferably the member 252 is supported by the support 266.

Thus if the portion of the member 252 parallel with the hinge 262 is placed on a deck having small articles as nuts and bolts, the two bearing plates 264 and 266 do not require a clean deck. Also the portion of the member 252 parallel with the hinge 262 may be disposed on a cowling or sill of a side port and then the apron portion 260 can be used to provide an incline from said cowling or sill to the deck of the vessel.

Constructions involving the members 250, 252, and preferably 262 can be made to withstand substantial loads and at the same time the device will accommodate itself to all conditions of the ship.

From the foregoing it will be apparent that as a ship lists from side to side and the trim or shear varies fore and aft of the ship or the ship moves forward or aft, the diagonal hinge means 254 of the apron as well as its shore side pivotal support are continuously operating so that the ship side edge of the triangular member 252 follows the changing plane or location of the level at the ship's deck or at the cowling of the ship in a side port. It is a characteristic of the apron of this invention that it is completely articulated so that the shore side portion will follow the level at the dock and at the same time the shipboard side of the apron will follow conditions which are constantly changing at the cowling of a side port or at the deck of a ship.

To interconnect the apron and the elevator, a connecting apron 281 is attached to the latter by means of hinges 282. As is apparent particularly from Figure 1, the connecting apron is adapted to be pivoted to an upright (dotted line) position in which it rests against a suitable support 284, where it does not interfere with the operation of the elevator.

There also may be provided vertical guides or runner strips 286 which are attached to cross head frame 72 by brackets 288, 290. When the elevator is in motion below the level of the apron, the connecting apron may be inclined with its outer edge resting against the runner strips and sliding thereon. The strips are so disposed that, when the elevator is opposite the apron, they permit the connecting apron to fall upon the latter, thereby instantaneously connecting the elevator and the apron and permitting the movement of vehicles across the same immediately upon stopping the elevator.

The apron assembly is raised and lowered by means of pulleys and cables which are preferably paired at the respective sides of the apron. Such pulleys are attached to the standards 82, 84 on the apron cross-head, one of these pulleys being indicated at 292. One cable 294 is dead ended on the support member 40 and passes around this pulley and upwardly over pulley 296 to drum 297 driven by motor 298, this construction being matched on the opposite side of the assembly. Thus by winding and unwinding the cable on the drum, the apron assembly may be moved to the desired elevation and maintained there, preferably through use of a conventional toothed support bar (not illustrated).

In operating the embodiment of Figures 1 to 7, inclusive, the vessel is berthed alongside the wharf with a side port therein substantially opposite the apron assembly, the latter being in an upright position. The apron assembly then is raised or lowered, as the case may be, by means of cables 294 until it is opposite the side port. The apron then is pushed past dead center, and permitted to drop upon the deck of the ship. When it is in this position, the bearing plates 264, 266 will support the load and the apron lip will be in uniform contact with the deck, regardless of the sheer of the deck or changes in its elevation with respect to the wharf. Furthermore, because of its ability to pivot in vertical and horizontal planes the apron will adjust itself automatically to compensate for longitudinal and vertical movement of the ship.

With the apron thus in position, the cargo may be loaded and unloaded using the elevator and connecting apron riding on the runner strips 286 in the manner explained above. When the cargo transferring operation has been completed, the apron may be lifted to its upright position either manually or by a suitably arranged lifting mechanism. This operation is facilitated by the presence of the adjustable stop means, i. e. the rods 222, which arrest the pivoting of the apron at an optimum position past dead center. It also is facilitated by means of the adjustable counterbalancing mechanism including the cam arms 200, 202 which may be adjusted to apply the desired or necessary moment to the apron. The counterbalancing mechanism is particularly effective to lift the apron to its upright position when the cross head 72 is lowered relative to a ship's deck 19 and the apron rests on such deck.

Thus by the present invention I have provided ship-loading apparatus which is articulated and universally applicable to the loading and unloading of ships of varying dimensions and design moored alongside wharfs in varying physical environments. The apparatus of my invention is adjustable readily and accurately in both vertical and horizontal directions to compensate for tidal variations in the ship's elevation as well as for horizontal misalignment of the ship and the loading apparatus. Still further, my loading apparatus provides means for compensating for the slope of the ship's deck caused either by its sheer or by inequalities of loading fore and aft. Still further, my apparatus is useful in conjunction with elevating means of varying construction, as for example with elevators and ramps, and when associated with the latter is driven through means carried by the ramp itself thereby providing an integrated unit of comparative simplicity.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

I claim:

1. Ship loading apparatus comprising an apron means pivotally mounted on a supporting structure having a horizontal axis carried thereby and angularly movable in a vertical plane; a counterweight assisting vertical angular displacement of the apron means; sheave means disposed above said apron means; a cam having an arcuate eccentric surface extending upwardly and outwardly pivoted to said apron means and angularly movable substantially in a vertical plane; means securing said cam in an adjusted angular position; and cable means suspendedly supporting said counterweight, reeved over said sheave means, reeved over said cam means, and secured to said apron means, whereby different moments of counterbalancing are applied to said apron means by said cable during its angular movement.

2. In a ship loading apparatus an apron means comprising a pivoted supporting portion and a pivoted apron portion supported thereon, one of said pivots being on a horizontal axis and the other of said pivots being on a vertical axis, adjustable stop means for limiting the extent of pivotal upward movement of said apron portion, said stop means including a rod pivotally connected to the horizontally pivoted portion of said apron means, and extending through an apertured plate carried by a relatively fixed support therebelow, an adjustable stop on the end of said rod adapted to engage the apertured plate when the apron portion is elevated, a cam mounted on said horizontally pivoted portion of said apron means and having an upwardly and outwardly curved surface, a counterweighted cable extending over said cam and dead ended to said cam carrying portion of said apron means.

3. Ship loading apparatus comprising a dock side supporting means mounted on first pivot means; a first triangular apron section mounted on said dock side supporting means by second pivot means, one of said first and said second pivot means having a horizontal axis and the other thereof having a vertical axis, said horizontal axis being substantially parallel to the dock side marginal portion of said first section, whereby said first section may be supported at the dock side along an axis substantially parallel to the dock side marginal edge portion thereof and also be supported at the ship side at the apex portion thereof directly away from said dock side marginal edge portion; a second triangular apron section; and hinge means uniting the two triangular sections into a diagonally hinged apron of substantially quadrilateral outline, whereby the dock side of said first triangular section may follow the level of a dock side supporting means and the ship board side of said second triangular section may follow the level and the position of a ship's deck or cowling.

4. The combination of claim 3 wherein the hinge means uniting the two substantially triangular sections comprises a plurality of hinges and associated stops for limiting downward and upward pivotal movement of the apron sections, said stops comprising aligned abutments carried by adjacent edge portions of adjacent sections.

5. The combination of claim 3 wherein a bearing plate is provided on the under side of said first triangular section at the area of the said apex portion and will provide for contact between said plate and the deck of a ship.

6. Ship loading apparatus comprising a relatively fixed support on the dock side; a trunnion frame pivotally mounted on said support by pivot means having a substantially horizontal axis; a first triangular apron section pivotally mounted at its dock side to said trunnion frame by pivot means having a substantially vertical axis, the said section being adapted to be supported at the apex portion thereof away from said dock side marginal portion by the deck or cowling of a ship; a second triangular apron section; and hinge means uniting another marginal edge portion of said first triangular apron section and a marginal portion of said second triangular apron section into a diagonally hinged apron section of substantially quadrilateral outline, whereby the dock side of said first triangular section may follow the level of a relatively fixed support on the dock side and the shipboard side of said second triangular section may follow the level and position of a ship's deck or cowling.

References Cited in the file of this patent
UNITED STATES PATENTS

| Number | Name | Date |
|---|---|---|
| 596,867 | Frick | Jan. 4, 1898 |
| 963,918 | Miller | July 12, 1910 |
| 1,034,061 | Benedict | July 30, 1912 |
| 1,778,847 | Dalin | Oct. 21, 1930 |
| 2,103,661 | Brown, Jr. | Dec. 28, 1937 |
| 2,372,574 | Haynes | Mar. 27, 1945 |
| 2,473,127 | Alexander | June 14, 1949 |
| 2,473,128 | Alexander | June 14, 1949 |
| 2,527,653 | Pierce | Oct. 31, 1950 |
| 2,547,460 | Hamilton, Jr. | Apr. 3, 1951 |